United States Patent
Tian et al.

(10) Patent No.: US 10,730,010 B2
(45) Date of Patent: Aug. 4, 2020

(54) DEVICE AND METHOD FOR PURIFYING SULFUR DIOXIDE AND NITROGEN OXIDE IN FLUE GAS

(71) Applicant: Kunming University of Science and Technology, Kunming (CN)

(72) Inventors: Senlin Tian, Kunming (CN); Yuxin Song, Kunming (CN); Jianhong Huang, Kunming (CN); Xuewei Hu, Kunming (CN); Yingjie Li, Kunming (CN); Ping Ning, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 16/515,634

(22) Filed: Jul. 18, 2019

(65) Prior Publication Data

US 2020/0023309 A1 Jan. 23, 2020

(30) Foreign Application Priority Data

Jul. 19, 2018 (CN) .......................... 2018 1 0795478

(51) Int. Cl.
*B01D 53/60* (2006.01)
*B01D 9/00* (2006.01)
*B01D 53/79* (2006.01)

(52) U.S. Cl.
CPC .............. *B01D 53/60* (2013.01); *B01D 9/00* (2013.01); *B01D 53/79* (2013.01); *B01D 2251/106* (2013.01); *B01D 2257/302* (2013.01); *B01D 2257/404* (2013.01); *B01D 2258/0283* (2013.01)

(58) Field of Classification Search
CPC .......... B01D 53/60; B01D 9/00; B01D 53/79; B01D 2257/302; B01D 2258/0283; B01D 2257/404; B01D 2251/106
See application file for complete search history.

(56) References Cited

U.S. PATENT DOCUMENTS 8,932,547 B2 * 1/2015 Nardo .................. B01D 53/229
423/210

\* cited by examiner

*Primary Examiner* — Arun S Phasge
(74) *Attorney, Agent, or Firm* — Troutman Sanders LLP; Christopher C. Close, Jr.

(57) ABSTRACT

The invention is a device and method for purifying sulfur dioxide and nitrogen oxide in flue gas with an electrolysis-chemical advanced oxidation enhanced ammonia method. The device includes a thermal activation reactor, ammonium hydroxide storage tank, absorption tower, electrolytic bath and crystallization separator. The method takes raw material part of an ammonium sulfate solution that is a reaction product of ammonia and sulfur oxide in flue gas, and an ammonium persulfate solution prepared by electrolysis of an electrolytic bath as an oxidant to enhance the efficiency of purifying sulfur dioxide and nitrogen oxide in the flue gas with an ammonia method. A thermal activation reactor activates an ammonium persulfate containing solution to generate a strong oxidizing $SO_4.^-$, so that $NO_x$ and $SO_2$ in the flue gas may be more efficiently converted into a product having higher solubleness for enhanced removal of sulfur dioxide and nitrogen oxide in the flue gas.

7 Claims, 1 Drawing Sheet

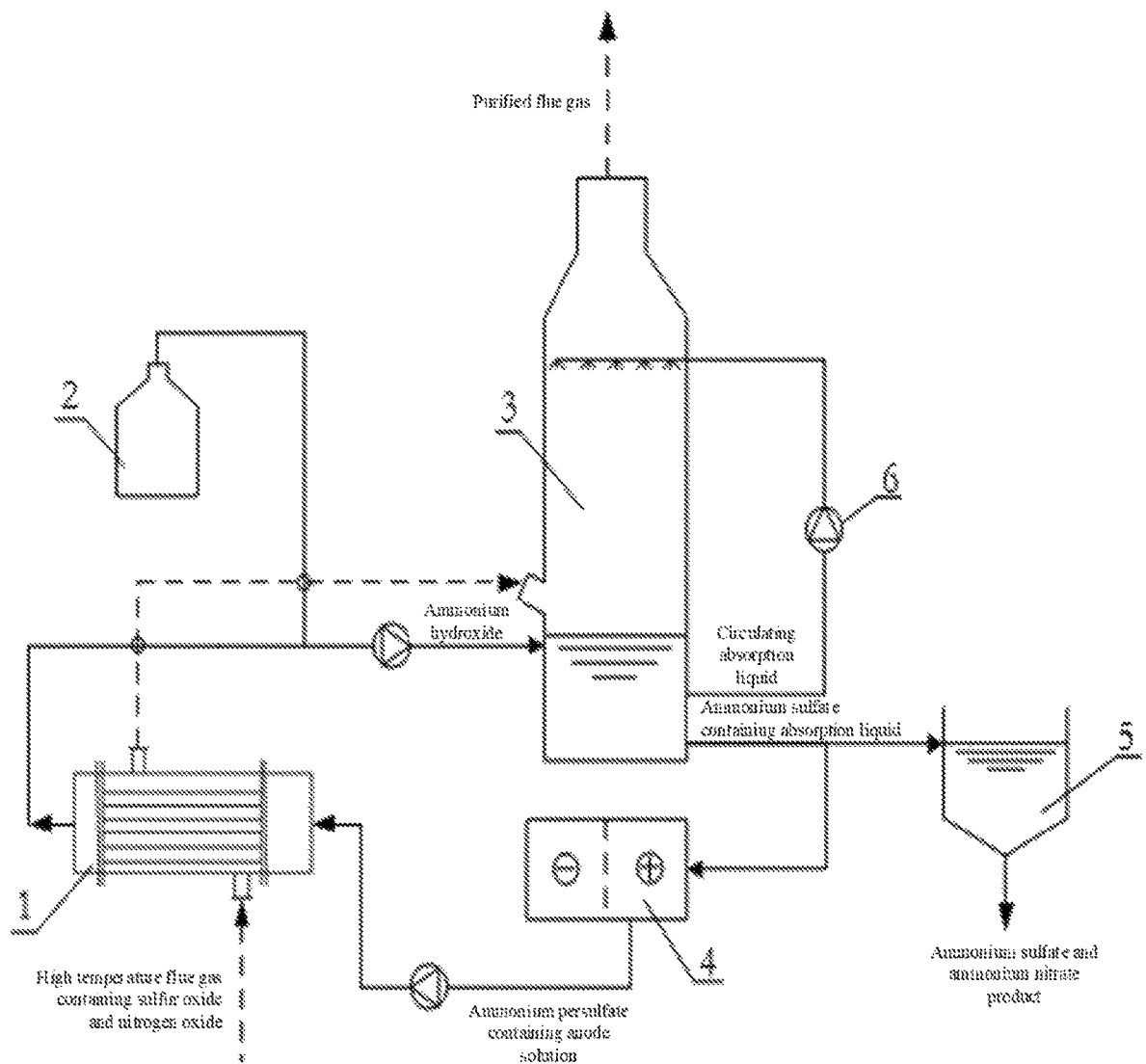

DEVICE AND METHOD FOR PURIFYING SULFUR DIOXIDE AND NITROGEN OXIDE IN FLUE GAS

This application claims priority to Chinese application number 201810795478.6, filed Jul. 19, 2018, with a title of DEVICE AND METHOD FOR PURIFYING SULFUR DIOXIDE AND NITROGEN OXIDE IN FLUE GAS. The above-mentioned patent application is incorporated herein by reference in its entirety.

TECHNICAL FIELD

The present invention relates to a device and method for purifying sulfur dioxide and nitrogen oxide in flue gas, and in particular to a device and method for purifying sulfur dioxide and nitrogen oxide in flue gas with an electrolysis-chemical advanced oxidation enhanced ammonia method, and belongs to the control field of flue gas emission pollutants.

BACKGROUND

Sulfur oxide and nitrogen oxide in flue gas are main precursor substances of acid rain. The acid rain pollution in China is in a severe situation. In every year, economic loss due to the acid rain and sulfur dioxide is up to hundreds of billion yuan throughout the country. In addition, the sulfur dioxide and nitrogen dioxide are also main pollutants participated in air quality evaluation. As a result, the control of emission of the sulfur oxide and the nitrogen oxide generated in a combustion process to an atmospheric environment has a very important practical significance.

A widely-used flue gas desulfurization and denitrification technology mainly is a wet-process limestone-gypsum flue gas desulfurization technology and an ammonia selective catalytic reduction technology. The above technical methods can implement the removal of the sulfur oxide and the nitrogen oxide in the flue gas respectively but fail to implement simultaneous desulfurization and denitrification on the flue gas. A traditional wet-process flue gas purification technology, such as limestone-gypsum flue gas desulfurization technology and ammonia flue gas desulfurization technology, cannot implement the simultaneous desulfurization and denitrification on the flue gas, which lies in a fact that 90% or more of nitrogen oxides in the flue gas are NO difficult to be dissolved and absorbed. Therefore, in order to realize an objective of the simultaneous desulfurization and denitrification on the flue gas, converting the NO in the flue gas into a form to be dissolved and absorbed easily is a key to solve the problem. CN101940871B discloses a "simultaneous desulfurization and denitrification system based on photochemical advanced oxidation". The method mainly decomposes a hydrogen peroxide by using ultraviolet excitation; and a strong oxidizing hydroxyl radical (•OH) is generated to contact with flue gas in a spray tower to take place a gas-liquid absorption reaction, thus oxidatively removing $NO_x$ and $SO_2$ in the flue gas. CN102166471B discloses an "integrated flue gas purification system based on heterogeneous Photo-Fenton". The method generates a strong oxidizing hydroxyl radical (•OH) by using the heterogeneous Photo-Fenton to oxidize $SO_2$, NO and the like in flue gas into $H_2SO_4$ and $HNO_3$, thus oxidatively removing the $SO_2$ and NO in the flue gas. CN202096874U discloses a "flue gas purification device based on advanced oxidation combined wet-process cleaning". The utility model mixes ozone generated by an ozone generator with flue gas, and inputs a mixture to a reactor having an ultraviolet tube; and under radiation and excitation of ultraviolet light, a strong oxidizing hydroxyl radical (•OH) is generated, and is oxidized with $SO_2$, insoluble NO and the like in the flue gas into a gaseous product having high solubleness, to enter a gas-liquid absorption tower to be absorbed by water for removal. CN103638796B discloses a "desulfurization-denitrification-demercuration system based on photoactivated ammonium persulfate". Flue gas emitted from a boiler or a kiln is subject to dedusting and temperature regulation to enter a photochemical reactor on a gas flue; and an ammonium persulfate solution from a liquid spray system is sprayed to the photochemical reactor in a mist form. An ultraviolet lamp in the photochemical reactor emits ultraviolet light to catalytically decompose the ammonium persulfate and release a strong oxidizing sulfate free radical ($SO_4.^-$) to remove $SO_2$, $NO_x$ and mercury in the flue gas oxidatively and simultaneously. CN104043325B discloses a "method and device for purifying flue gas with ozone activated persulfate". According to the method, the ozone in the flue gas contacts with persulfate in a solution in a bubbling-spraying two-stage reactor to generate strong oxidizing sulfate free radical and hydroxyl free radical to oxidatively remove $SO_2$, $NO_x$ and other pollutants in the flue gas.

SUMMARY

In order to implement enhanced removal of sulfur dioxide and nitrogen oxide in flue gas, the present invention provides a device and method for purifying sulfur dioxide and nitrogen oxide in flue gas with an electrolysis-chemical advanced oxidation enhanced ammonia method.

A technical solution adopted by the present invention is as follows:

A device for purifying sulfur dioxide and nitrogen oxide in flue gas with an electrolysis-chemical advanced oxidation enhanced ammonia method includes a thermal activation reactor, an ammonium hydroxide storage tank, an absorption tower, an electrolytic bath and a crystallization separator; a shell side inlet of the thermal activation reactor communicates with high temperature flue gas, and an outlet of the thermal activation reactor communicates with a gas inlet of the absorption tower; a tube side inlet of the thermal activation reactor communicates with an outlet of the electrolytic bath, and a power pump is disposed on a tube line; a tube side outlet of the thermal activation reactor communicates with a liquid inlet of the absorption tower, the ammonium hydroxide storage tank also communicates with the liquid inlet of the absorption tower, and the power pump is disposed on the tube line; a circulating absorption liquid outlet of the absorption tower communicates with a spray atomization system, and the power pump is disposed on the tube line; and a liquid outlet of the absorption tower respectively communicates with the crystallization separator and the electrolytic bath.

Preferably, the thermal activation reactor is of a shell-and-tube type, and is made of a stainless steel or a ceramic.

Preferably, a cathode chamber and an anode chamber of the electrolytic bath are separated by a platy cation exchange membrane; an anode of the electrolytic bath uses a pure platinum, titanium-based platinized or graphite electrode, and a cathode of the electrolytic bath uses a graphite or titanium electrode; and the tube side inlet of the thermal activation reactor communicates with the anode of the electrolytic bath.

A method for purifying sulfur dioxide and nitrogen oxide in flue gas with an electrolysis-chemical advanced oxidation enhanced ammonia method includes: first introducing high temperature flue gas containing the sulfur dioxide and the nitrogen oxide to a shell side of a thermal activation reactor for circulation, where a tube side of the thermal reactivation reactor circulates an ammonium persulfate containing solution obtained by electrolysis of an electrolytic bath, the high temperature flue gas and the ammonium persulfate containing solution implement indirect heat exchange in the thermal activation reactor, and ammonium persulfate is activated to generate a strong oxidizing $SO_4.^-$; and then, inputting the flue gas to an absorption tower via a gas tube line, inputting an $SO_4.^-$ containing solution, subject to the heat exchange and activation, to the absorption tower via a liquid delivery tube line, and simultaneously inputting ammonium hydroxide to the absorption tower via the liquid delivery tube line from an ammonium hydroxide storage tank, where as a flue gas absorption liquid, the $SO_4.^-$ containing solution and the ammonium hydroxide contact with $SO_2$ and $NO_x$ in the flue gas by spray atomization for reaction, to oxidatively remove the $SO_2$ and the $NO_x$ in the flue gas, the $SO_2$ and the $NO_x$ are converted into a product having higher solubleness such as $SO_3$, $H_2SO_4$, $NO_2$ and $HNO_3$, and simultaneously react with the ammonium hydroxide in the absorption liquid to generate a solution containing ammonium sulfate and ammonium nitrate, one part of the solution containing the ammonium sulfate and the ammonium nitrate serves as a raw material solution for generating ammonium persulfate by electrolysis of the electrolytic bath, and the other part of the solution containing the ammonium sulfate and the ammonium nitrate is input to a crystallization separator to obtain an ammonium sulfate and ammonium nitrate product.

Preferably, the raw material solution for generating the ammonium persulfate by the electrolysis in the electrolytic bath contains 20-45 wt % of ammonium sulfate.

Preferably, the anodic current density of the electrolytic bath at least is 0.8 A/cm$^2$, the electrolysis time is 3-6 h, and the pH of the anode chamber is maintained at 3-7.

Principle: a by-product in flue gas desulfurization and denitrification is an ammonium sulfate containing solution; and with a part of the ammonium sulfate containing solution as a raw material solution for preparing ammonium persulfate by electrolysis of an electrolytic bath, and the ammonium persulfate as an oxidant, $NO_x$ and $SO_2$ in flue gas are oxidized, and NO in the flue gas is converted into a form to be dissolved and absorbed easily, thus implementing an objective of simultaneous desulfurization and denitrification on the flue gas based on an ammonia method. Additionally, with a view to a great amount of waste heat in the flue gas, in order to fully utilize heat energy of the flue gas, a thermal activation reactor is disposed in a device of the present invention. The thermal activation reactor is configured to implement heat exchange between the flue gas and the ammonium persulfate containing solution prepared by the electrolysis of the electrolytic bath.

The principle that the ammonium persulfate containing solution prepared by the electrolysis of the electrolytic bath exchanges heat with the flue gas via the shell-and-tube type thermal activation reactor to be activated to generate the strong oxidizing $SO_4.^-$ is as shown in the following formula (1):

$$S_2O_8^{2-} + \text{heat} \rightarrow 2SO_4.^- \qquad (1)$$

The $SO_4.^-$ has a relatively high oxidation-reduction potential as shown in the following formula (2), so that the $SO_2$, and the NO to be dissolved and absorbed difficultly in the flue gas may be converted into $SO_3$, $H_2SO_4$, $NO_2$ and $HNO_3$ having higher solubleness, to be oxidatively removed to implement an objective of purification on the flue gas.

$$SO_4.^- + e^- \rightarrow SO_4^{2-}, 2.5\text{-}3.1 \text{ V} \qquad (2)$$

The beneficial effects of the present invention are:

(1) A raw material solution for generating an ammonium persulfate oxidant by electrolysis of an electrolytic bath is an ammonium sulfate containing solution generated by flue gas desulfurization and denitrification in the present invention; in addition, after $NO_x$ and $SO_2$ in flue gas are oxidatively removed by ammonium persulfate, the ammonium persulfate is reduced into ammonium sulfate, same as a desulfurization by-product of the present invention; and therefore, no harmful component is introduced in a desulfurization and denitrification process. When the desulfurization by-product is directly taken as a raw material for generating the ammonium persulfate by the electrolysis and is used as the oxidant for purifying the flue gas, the steps of separating the ammonium persulfate by crystallization, drying and the like are omitted, and the cost of the oxidant raw material is greatly reduced.

(2) An ammonium persulfate containing solution generated by the electrolysis of the electrolytic bath is activated by a shell-and-tube type thermal activation reactor to generate a strong oxidizing $SO_4.^-$, so that $SO_2$, and NO to be dissolved and absorbed difficultly in the flue gas may be removed oxidatively and more efficiently to implement an objective of purification on the flue gas.

(3) In the present invention, waste heat of the flue gas is utilized efficiently and fully, and is used for heat exchange and activation of the ammonium persulfate containing solution generated by the electrolysis of the electrolytic bath; and furthermore, an ammonium sulfate and ammonium nitrate product obtained by crystallization separation of the present invention may be used as a raw material for producing a fertilizer.

BRIEF DESCRIPTION OF THE DRAWINGS

FIG. 1 is a schematic diagram of a device and a technological process according to the present invention.

In the FIGURE: 1—thermal activation reactor, 2—ammonium hydroxide storage tank, 3—absorption tower, 4—electrolytic bath, 5—crystallization separator, and 6—power pump.

DETAILED DESCRIPTION

The present invention will be further described below in detail in conjunction with an accompanying drawing and a specific embodiment. However, a protection scope of the present invention is not limited to the content.

Embodiment 1

A device for purifying sulfur dioxide and nitrogen oxide in flue gas with an electrolysis-chemical advanced oxidation enhanced ammonia method includes a thermal activation reactor 1, an ammonium hydroxide storage tank 2, an absorption tower 3, an electrolytic bath 4 and a crystallization separator 5; a shell side inlet of the thermal activation reactor 1 communicates with high temperature flue gas, and an outlet of the thermal activation reactor 1 communicates with a gas inlet of the absorption tower 3; a tube side inlet of the thermal activation reactor 1 communicates with an outlet of the electrolytic bath 4, and a power pump 6 is disposed on a tube line; a tube side outlet of the thermal activation reactor 1 communicates with a liquid inlet of the absorption tower 3, the ammonium hydroxide storage tank 2 also communicates with the liquid inlet of the absorption tower 3, and the power pump 6 is disposed on the tube line; a circulating absorption liquid outlet of the absorption tower 3 communicates with a spray atomization system, and the power pump 6 is disposed on the tube line; and a liquid outlet of the absorption tower 3 respectively communicates with the crystallization separator 5 and the electrolytic bath 4.

Embodiment 2

The structure in this embodiment is basically the same as that in the embodiment 1; and the difference lies in that the thermal activation reactor 1 is of a shell-and-tube type, and is made of a stainless steel.

Embodiment 3

The structure in this embodiment is basically the same as that in the embodiment 2; and the difference lies in that the thermal activation reactor 1 is made of a ceramic.

Embodiment 4

The structure in this embodiment is basically the same as that in the embodiment 1. The differences lie in that a cathode chamber and an anode chamber of the electrolytic bath 4 are separated by a platy cation exchange membrane; an anode of the electrolytic bath 4 uses a pure platinum, titanium-based platinized or graphite electrode, and a cathode of the electrolytic bath 4 uses a graphite or titanium electrode; and the tube side inlet of the thermal activation reactor 1 communicates with the anode of the electrolytic bath 4.

Embodiment 5

A method for purifying sulfur dioxide and nitrogen oxide in flue gas by using the device in the embodiment 1 is as follows: as shown in FIG. 1, (where, a dotted arrow is a mass transfer direction of the flue gas), high temperature flue gas containing sulfur oxide and the nitrogen oxide is introduced to a shell side of a thermal activation reactor 1 first; meanwhile, a by-product (a solution containing ammonium sulfate and ammonium nitrate) in flue gas desulfurization and denitrification of the present invention is taken as a raw material solution, and an ammonium persulfate containing solution obtained by electrolysis on an anode of an electrolytic bath 4 is input to a tube side of the thermal activation reactor 1; through the shell-and-tube type thermal activation reactor 1, the convective heat exchange is implemented between the flue gas and the ammonium persulfate containing solution; the flue gas after the heat exchange is introduced to an absorption tower 3, and an activated $SO_4.^-$ containing solution is taken as a flue gas purifying absorption liquid together with ammonium hydroxide in an ammonium hydroxide storage tank 2; and with a spray atomization system in the absorption tower 3, the oxidative absorption to the sulfur oxide and the nitrogen oxide in the flue gas is implemented. $SO_2$ and $NO_x$ are converted into a product having higher solubleness such as $SO_3$, $H_2SO_4$, $NO_2$ and $HNO_3$, and simultaneously react with the ammonium hydroxide in the absorption liquid to generate a solution containing ammonium sulfate and ammonium nitrate; one part of the solution containing the ammonium sulfate and the ammonium nitrate serves as a raw material solution for generating the ammonium persulfate by the electrolysis of the electrolytic bath 4, and the other part of the solution containing the ammonium sulfate and the ammonium nitrate is input to a crystallization separator 5 to obtain an ammonium sulfate and ammonium nitrate product. The flue gas purified to be up to a standard is directly emitted to an atmospheric environment.

The temperature of the flue gas is 350° C., the concentrations of the $SO_2$ and the $NO_x$ respectively are 2500 ppm and 500 ppm, and the temperature of the flue gas to enter the absorption tower is 50° C.; a cathode chamber and an anode chamber of the electrolytic bath take a platy Nafion 427 type perfluorosulfonic acid cation exchange membrane as a separation membrane, a solution containing 25 wt % of ammonium sulfate is used as an anode electrolyte, the pH of the anode chamber is maintained at 3-7, both a cathode and an anode use a graphite plate, the anodic current density is 1.3 A/cm$^2$, the electrolysis lasts for 3.0 h, and after the heat exchange of the thermal activation reactor, the temperature of the activated ammonium sulfate containing solution to enter the absorption tower is not smaller than 50° C.; and a liquid-gas ratio for flue gas desulfurization and denitrification is 20 L/m$^3$. An experimental result on a small system for purifying sulfur oxide and nitrogen oxide in flue gas is: efficiencies for simultaneously removing $SO_2$ and $NO_x$ in the flue gas are up to 100% and 77.6% respectively.

Embodiment 6

Steps of a method in this embodiment are the same as those in the embodiment 5. The temperature of the flue gas is 350° C., the concentrations of the $SO_2$ and the $NO_x$ respectively are 2500 ppm and 500 ppm, and after the heat exchange of the thermal activation reactor, the temperature of the flue gas to enter the absorption tower is 50° C.; a cathode chamber and an anode chamber of the electrolytic bath take a platy Nafion 427 type perfluorosulfonic acid cation exchange membrane as a separation membrane, a solution containing 20 wt % of ammonium sulfate is used as an anode electrolyte, the pH of the anode chamber is maintained at 3-7, a cathode uses a titanium plate and an anode uses a graphite plate, the anodic current density is 0.8 A/cm2, the electrolysis lasts for 6.0 h, and after the heat exchange of the thermal activation reactor, the temperature of the activated ammonium sulfate containing solution to enter the absorption tower is not smaller than 50° C.; and a liquid-gas ratio for flue gas desulfurization and denitrification is 20 L/m3. An experimental result on a small system for purifying sulfur oxide and nitrogen oxide in flue gas is: efficiencies for simultaneously removing $SO_2$ and $NO_x$ in the flue gas are up to 100% and 77.2% respectively.

Embodiment 7

Steps of a method in this embodiment are the same as those in the embodiment 5. The temperature of the flue gas is 350° C., the concentrations of the $SO_2$ and the $NO_x$ respectively are 4000 ppm and 800 ppm, and after the heat exchange of the thermal activation reactor, the temperature of the flue gas to enter the absorption tower is 50° C.; a cathode chamber and an anode chamber of the electrolytic bath take a platy polytetrafluoroethylene cation exchange membrane as a separation membrane, a solution containing 45 wt % of ammonium sulfate is used as an anode electrolyte, the pH of the anode chamber is maintained at 3-7, a cathode uses a graphite plate and an anode uses a platinum plate, the anodic current density is 1.5 A/cm2, the electrolysis lasts for 4.0 h, and after the heat exchange of the thermal activation reactor, the temperature of the activated ammonium sulfate containing solution to enter the absorption tower is not smaller than 50° C.; and a liquid-gas ratio for flue gas desulfurization and denitrification is 20 L/m3. An experimental result on a small system for purifying sulfur oxide and nitrogen oxide in flue gas is: efficiencies for simultaneously removing $SO_2$ and $NO_x$ in the flue gas are up to 100% and 79.6% respectively.

Embodiment 8

Steps of a method in this embodiment are the same as those in the embodiment 5. The temperature of the flue gas is 350° C., the concentrations of the SO2 and the NOx respectively are 3000 ppm and 600 ppm, and after the heat exchange of the thermal activation reactor, the temperature of the flue gas to enter the absorption tower is 50° C.; a cathode chamber and an anode chamber of the electrolytic bath take a platy Nafion 117 type cation exchange membrane as a separation membrane, a solution containing 35 wt % of ammonium sulfate is used as an anode electrolyte, the pH of the anode chamber is maintained at 3-7, a cathode uses a graphite plate and an anode uses a titanium-based platinized plate, the anodic current density is 0.9 A/cm2, the electrolysis lasts for 5.0 h, and after the heat exchange of the thermal activation reactor, the temperature of the activated ammonium sulfate containing solution to enter the absorption tower is not smaller than 50° C.; and a liquid-gas ratio for flue gas desulfurization and denitrification is 20 L/m3. An experimental result on a small system for purifying sulfur oxide and nitrogen oxide in flue gas is: efficiencies for simultaneously removing $SO_2$ and $NO_x$ in the flue gas are up to 100% and 78.3% respectively.

The above describes the specific embodiments of the present invention in detail. However, the present invention is not limited to the above embodiment. A person of ordinary skill in the art may further make various changes without departing from a tenet of the present invention within a scope of knowledge.

What is claimed is:

1. A device for purifying sulfur dioxide and nitrogen oxide in flue gas with an electrolysis-chemical advanced oxidation enhanced ammonia method, comprising a thermal activation reactor (1), an ammonium hydroxide storage tank (2), an absorption tower (3), an entire electrolytic cell (4) and a crystallization separator (5), wherein a shell side inlet of the thermal activation reactor (1) communicates with high temperature flue gas, and an outlet of the thermal activation reactor (1) communicates with a gas inlet of the absorption tower (3); a tube side inlet of the thermal activation reactor (1) communicates with an outlet of the entire electrolytic cell (4), and a first power pump (6) is disposed on a tube line; a tube side outlet of the thermal activation reactor (1) communicates with a liquid inlet of the absorption tower (3), the ammonium hydroxide storage tank (2) also communicates with the liquid inlet of the absorption tower (3), and a second power pump (6) is disposed on the tube line; a circulating absorption liquid outlet of the absorption tower (3) communicates with a spray atomization system, and a third power pump (6) is disposed on the tube line; and a liquid outlet of the absorption tower (3) respectively communicates with the crystallization separator (5) and the entire electrolytic cell (4).

2. The device according to claim 1, wherein the thermal activation reactor (1) is of a shell-and-tube structure, and is made of a stainless steel or a ceramic.

3. The device according to claim 1, wherein a cathode chamber and an anode chamber of the entire electrolytic cell (4) are separated by a plate-like cation exchange membrane; and an anode of the entire electrolytic cell (4) uses a pure platinum, titanium-based platinum-plated or graphite electrode, and a cathode of the entire electrolytic cell (4) uses a graphite or titanium electrode.

4. The device according to claim 3, wherein the tube side inlet of the thermal activation reactor (1) communicates with the anode of the entire electrolytic cell (4).

5. A method for purifying sulfur dioxide and nitrogen oxide in flue gas with an electrolysis-chemical advanced oxidation enhanced ammonia method, comprising the following steps: first introducing high temperature flue gas containing the sulfur dioxide and the nitrogen oxide to a shell side of a thermal activation reactor (1) for circulation, wherein a tube side of the thermal activation reactor (1) circulates an ammonium persulfate containing solution obtained by electrolysis of an entire electrolytic cell (4), the high temperature flue gas and the ammonium persulfate containing solution implement indirect heat exchange in the thermal activation reactor (1), and ammonium persulfate is activated to generate a strong oxidizing $SO_4.^-$; and then, inputting the flue gas to an absorption tower (3) via a gas tube line, inputting the $SO_4.^-$ containing solution, subject to the heat exchange and activation, to the absorption tower (3) via a liquid delivery tube line, and simultaneously inputting ammonium hydroxide to the absorption tower (3) via the liquid delivery tube line from an ammonium hydroxide storage tank (2), wherein as a flue gas absorption liquid, the $SO_4.^-$ containing solution and the ammonium hydroxide contact with $SO_2$ and $NO_x$ in the flue gas by spray atomization for reaction, to oxidatively remove the $SO_2$ and the $NO_x$ in the flue gas, the $SO_2$ and the $NO_x$ are converted into a product having higher solubleness such as $SO_3$, $H_2SO_4$, $NO_2$ and $HNO_3$, and simultaneously react with the ammonium hydroxide in the absorption liquid to generate a solution containing ammonium sulfate and ammonium nitrate, one part of the solution containing the ammonium sulfate and the ammonium nitrate serves as a raw material solution for generating ammonium persulfate by electrolysis of the entire electrolytic cell (4), and the other part of the solution containing the ammonium sulfate and the ammonium nitrate is input to a crystallization separator (5) to obtain an ammonium sulfate and ammonium nitrate product.

6. The method according to claim 5, wherein the raw material solution for generating the ammonium persulfate by the electrolysis in the entire electrolytic cell (4) contains 20-45 wt % of ammonium sulfate.

7. The method according to claim 5, wherein anodic current density of the entire electrolytic cell (4) is 0.8 A/cm$^2$ or more, electrolysis time is 3-6 h, and pH of the anode chamber is maintained at 3-7.

* * * * *